United States Patent
Hyde et al.

(10) Patent No.: US 9,997,913 B2
(45) Date of Patent: Jun. 12, 2018

(54) SYSTEMS AND METHODS FOR OPERATION OF AN AC POWER SUPPLY DISTRIBUTION CIRCUIT

(75) Inventors: Roderick A. Hyde, Redmond, WA (US); Jordin T. Kare, Seattle, WA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 933 days.

(21) Appl. No.: 13/373,233

(22) Filed: Nov. 7, 2011

(65) Prior Publication Data

US 2013/0113282 A1 May 9, 2013

Related U.S. Application Data

(63) Continuation of application No. 13/373,234, filed on Nov. 7, 2011, now Pat. No. 9,093,863.

(51) Int. Cl.
*H02J 3/14* (2006.01)
*H02J 3/00* (2006.01)

(52) U.S. Cl.
CPC .......... *H02J 3/14* (2013.01); *H02J 2003/003* (2013.01); *Y02B 70/3225* (2013.01); *Y04S 10/54* (2013.01); *Y04S 20/222* (2013.01); *Y10T 307/406* (2015.04); *Y10T 307/438* (2015.04)

(58) Field of Classification Search
CPC ... H02J 3/14; H02J 2003/003; Y10T 307/438; Y10T 307/406; Y04S 10/54; Y04S 20/222; Y02B 70/3225

USPC .......................................................... 700/286
See application file for complete search history.

(56) References Cited

U.S. PATENT DOCUMENTS

| | | | |
|---|---|---|---|
| 3,704,380 A * | 11/1972 | Cohn ............................. 307/52 |
| 3,736,470 A | 5/1973 | Ford et al. |
| 3,955,134 A | 5/1976 | Woodford |
| 4,296,450 A | 10/1981 | Paice et al. |
| 4,324,987 A * | 4/1982 | Sullivan et al. ................ 307/35 |
| 4,354,241 A | 10/1982 | Barello |
| 4,611,289 A | 9/1986 | Coppola |
| 4,628,313 A | 12/1986 | Gombrich et al. |
| 4,804,957 A | 2/1989 | Selph et al. |
| 4,899,129 A | 2/1990 | MacFadyen et al. |
| 4,899,217 A | 2/1990 | MacFadyen et al. |
| 5,218,552 A | 6/1993 | Stirk et al. |
| 5,323,307 A | 6/1994 | Wolf et al. |
| 5,572,438 A | 11/1996 | Ehlers et al. |
| 5,574,653 A | 11/1996 | Coomer et al. |
| 5,754,036 A | 5/1998 | Walker |
| 5,754,445 A * | 5/1998 | Jouper et al. ................. 700/295 |
| 6,362,540 B1 | 3/2002 | Hill |
| 6,704,181 B2 | 3/2004 | Saksa |
| 6,917,124 B2 | 7/2005 | Shetler, Jr. et al. |
| 7,002,265 B2 | 2/2006 | Potega |
| 7,043,380 B2 | 5/2006 | Rodenberg, III et al. |
| 7,203,622 B2 | 4/2007 | Pan et al. |
| 7,656,059 B2 | 2/2010 | Wang et al. |
| 7,672,104 B2 | 3/2010 | Reynolds et al. |
| 7,839,020 B2 | 11/2010 | Nakanishi |

(Continued)

*Primary Examiner* — Thomas C Lee
*Assistant Examiner* — Tri T Nguyen

(57) ABSTRACT

Systems and methods for operation of an AC power supply distribution circuit that has a limited supply capacity rely on dynamically measured available load capacity to regulate operation of the AC power supply circuit, and existing and potential loads, to avoid fault or damage.

37 Claims, 3 Drawing Sheets

(56) References Cited

U.S. PATENT DOCUMENTS

| | | |
|---|---|---|
| 7,881,907 B2 | 2/2011 | Curt et al. |
| 8,255,090 B2 | 8/2012 | Frader-Thompson et al. |
| 8,364,287 B2 | 1/2013 | Pearson et al. |
| 8,415,830 B2 | 4/2013 | Lim et al. |
| 8,447,435 B1 | 5/2013 | Miller et al. |
| 8,659,181 B2 | 2/2014 | Choi et al. |
| 8,849,472 B2 | 9/2014 | Pugh et al. |
| 9,093,863 B2 * | 7/2015 | Hyde |
| 2001/0010032 A1 | 7/2001 | Ehlers et al. |
| 2002/0024332 A1 * | 2/2002 | Gardner .................. 324/103 R |
| 2002/0084655 A1 | 7/2002 | Lof et al. |
| 2002/0101695 A1 | 8/2002 | Saksa |
| 2002/0191024 A1 | 12/2002 | Huneycutt |
| 2003/0048006 A1 | 3/2003 | Shelter, Jr. et al. |
| 2003/0050737 A1 | 3/2003 | Ossan, Jr. |
| 2004/0015242 A1 * | 1/2004 | Brown .................. G05B 15/02 700/12 |
| 2004/0084965 A1 | 5/2004 | Welches et al. |
| 2004/0267394 A1 | 12/2004 | Kempf et al. |
| 2005/0034023 A1 | 2/2005 | Maturana et al. |
| 2005/0060107 A1 | 3/2005 | Rodenberg, III et al. |
| 2005/0099314 A1 | 5/2005 | Aisa |
| 2005/0226017 A1 | 10/2005 | Kotsopoulos et al. |
| 2005/0235174 A1 | 10/2005 | Curt et al. |
| 2005/0207079 A1 | 11/2005 | Tiller et al. |
| 2006/0276938 A1 | 12/2006 | Miller |
| 2007/0271006 A1 | 11/2007 | Golden et al. |
| 2007/0299562 A1 | 12/2007 | Kates |
| 2008/0258557 A1 * | 10/2008 | Lathrop .................. H02J 3/14 307/25 |
| 2008/0278003 A1 | 11/2008 | Pouchet et al. |
| 2009/0062970 A1 | 3/2009 | Forbes, Jr. et al. |
| 2009/0164824 A1 | 6/2009 | Langgood et al. |
| 2009/0206059 A1 | 8/2009 | Kiko |
| 2009/0282274 A1 | 11/2009 | Langgood et al. |
| 2010/0004790 A1 | 1/2010 | Harbin, III et al. |
| 2010/0023174 A1 | 1/2010 | Nagata et al. |
| 2010/0070100 A1 | 3/2010 | Finlinson et al. |
| 2010/0217452 A1 | 8/2010 | McCord et al. |
| 2010/0295383 A1 | 11/2010 | Cummings |
| 2011/0106321 A1 * | 5/2011 | Cherian .................. H02J 3/00 700/286 |
| 2011/0125657 A1 | 5/2011 | Boss et al. |
| 2011/0133558 A1 | 6/2011 | Park |
| 2011/0175450 A1 * | 7/2011 | Vicari et al. .................. 307/62 |
| 2011/0320834 A1 * | 12/2011 | Ingels .................. G06F 1/266 713/310 |
| 2012/0065801 A1 * | 3/2012 | Rossi .................. G06F 1/263 700/295 |
| 2012/0179301 A1 | 7/2012 | Aivaliotis et al. |
| 2012/0181861 A1 | 7/2012 | Bröckmann et al. |
| 2012/0181973 A1 | 7/2012 | Lyden |
| 2012/0271460 A1 | 10/2012 | Rognli |
| 2012/0330473 A1 * | 12/2012 | Meredith et al. .................. 700/291 |
| 2014/0018971 A1 | 1/2014 | Ellis et al. |

\* cited by examiner

310
Dynamically determine the available load capacity an AC power supply circuit that has a limited total capacity for supplying power to one or more electrical loads

320
Report the dynamically available load capacity of the AC power supply circuit to one or more electrical loads, potential electrical loads, and/or other devices connected to the AC power supply circuit

330
Control operations of one or more components of the AC power supply circuit and/or the existing or potential electrical loads in response to available load capacity information

SYSTEMS AND METHODS FOR OPERATION OF AN AC POWER SUPPLY DISTRIBUTION CIRCUIT

RELATED APPLICATIONS

For purposes of the USPTO extra-statutory requirements, the present application constitutes a continuation of U.S. patent application Ser. No. 13/373,234, entitled SMART CIRCUIT BREAKER, naming Roderick A. Hyde; Jordin T. Kare; and Lowell L. Wood, Jr. as inventors, filed on Nov. 7, 2011, now U.S. Pat. No. 9,093,863, which is currently co-pending, or is an application of which a currently co-pending application entitled to the benefit of the filing date.

BACKGROUND

The present application relates, in general, to power management. In particular, the application relates to controlling power draw by electronic and/or electrical devices from a power line or distribution grid. In particular, the present application relates to AC power supply circuit for a power line or distribution grid downstream of a high-voltage power transmission line.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation of its parent applications as set forth above, but expressly points out that such designations are not to be construed in any way as any type of commentary and/or admission as to whether or not the present application contains any new matter in addition to the matter of its parent application(s).

BACKGROUND

Power utilities generate electrical power at remote plants and deliver electricity to residential, business or industrial customers via transmission networks and distribution grids. The power utilities may transmit large quantities of electric power over long distance transmission networks from power generating plants to regional substations, which then supply the power to local customers using the distribution grids.

The transmission networks and/or distribution grids may include overhead power transmission lines suspended by towers or poles. The transmission lines may, for example, be bare wire conductors made of aluminum. Instead of aluminum, copper wires may be used in medium-voltage distribution and low-voltage connections to customer premises.

Power is typically first transmitted as high voltage transmissions from the remote power plants to geographically diverse substations. The most common transmission voltages in use are 765, 500, 400, 220 kV, etc. Transmission voltages higher than 800 kV are also in use. From the substations, the received power is sent using cables or "feeders" to local transformers that further reduce the voltage. Voltages below 69 kV are termed sub transmission or distribution voltages. The outputs of the transformers are connected to a local low voltage power distribution grid that can be tapped directly by the customers.

Power failures at substations, local transformers or at customer sites often occur due to imbalanced loading or demand at the point of use. For example, residential circuit breakers often trip when appliances (e.g., dryers, ovens, etc.) overload the residential supply circuit. Similarly in a factory simultaneous operation of several industrial machines may overload and exceed the power supply to the factory.

Consideration is now being given to improving management of power supply and use at the customer level downstream of substations in a distribution grid. In particular, consideration is now being given to solutions to prevent overloading and prevent damage to supply lines and/or electrical loads.

SUMMARY

Solutions are provided for managing an AC power supply circuit having a limited power capacity and its use.

In an exemplary solution, a sensing circuit/smart circuit breaker configured to dynamically determine the available load capacity of the AC power supply circuit. A reporting circuit is configured to report the dynamically available load capacity of the AC power supply circuit to an external controller, an existing electrical load, and/or a potential electrical load on the AC power supply circuit.

BRIEF DESCRIPTION OF THE FIGURES

In the accompanying drawings:

FIG. 3 is a flow diagram illustrating an exemplary method for managing an AC power supply circuit and its use, in accordance with the principles of the solutions described herein.

Throughout the figures, unless otherwise stated, the same reference numerals and characters are used to denote like features, elements, components, or portions of the illustrated embodiments.

DESCRIPTION

In the following description of exemplary embodiments, reference is made to the accompanying drawings, which form a part hereof. It will be understood that embodiments described herein are exemplary, but are not meant to be limiting. Further, it will be appreciated that the solutions described herein can be practiced or implemented by other than the described embodiments. Modified embodiments or alternate embodiments may be utilized, in the spirit and scope of the solutions described herein.

One approach is directed to improving management of power supply and use at the customer level downstream of substations in a distribution grid. In particular, the solutions provided herein concern AC power supply lines or circuits that are typically deployed downstream of circuit breakers (e.g., low voltage or medium-voltage circuit breakers) to supply power to customers. A conventional circuit breaker's basic function is to detect a fault condition (e.g., an overload or short condition). In an attempt to avoid damage to the supply circuit and/or electrical loads due to the fault condition, the conventional circuit breaker abruptly interrupts circuit continuity to immediately discontinue electrical flow in the power supply circuit. All of the electrical loads connected the power supply circuit are without power. The conventional circuit breaker can be reset to resume normal power supply. Each electrical load must be restarted.

A solution provides a smart circuit breaker that as an alternate to, or in addition to the "fault condition/interruption" feature of a conventional circuit breaker includes one or more features that avoid actual or potential fault conditions in an AC power supply circuit. The one or more features may involve active management of the operations of the AC power supply circuit and electrical loads connected to it. The managed electrical loads may include actual and/or potential loads.

One such feature of a smart circuit breaker is an AC power supply circuit monitoring device. The monitoring device may be configured to monitor operation of an AC power supply circuit that has a limited capacity for supplying power to one or more electrical loads.

Figure 1:
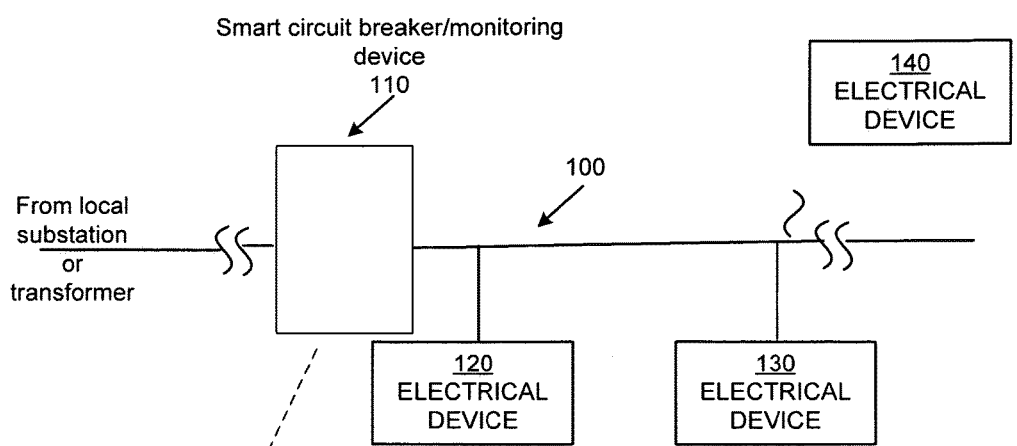
FIG. 1 is a block diagram illustrating components of an exemplary smart circuit breaker/monitoring device for an AC power supply circuit, in accordance with the principles of the solutions described herein.
Figure 1B:
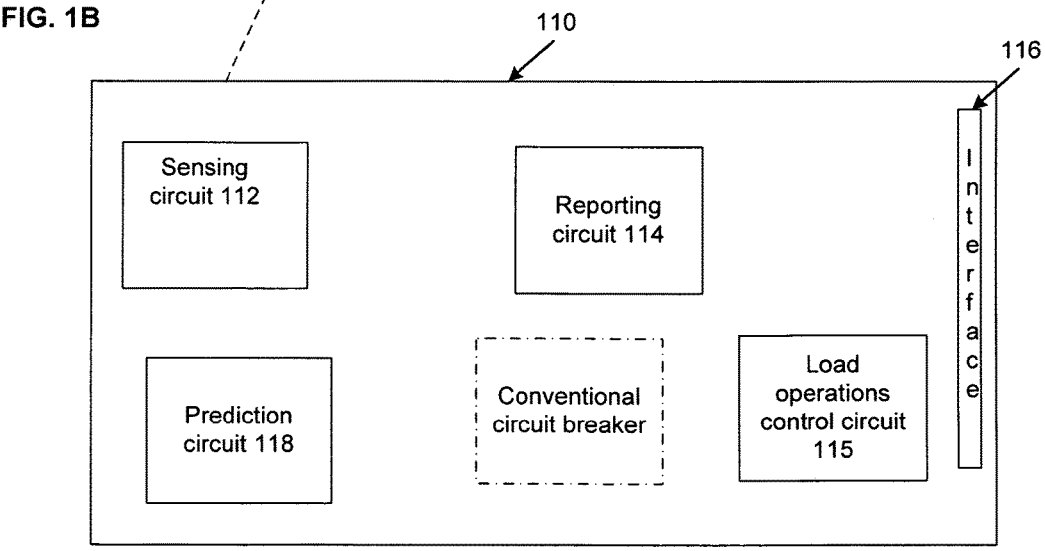

FIG. 1 shows an exemplary monitoring device 110 deployed to monitor electrical parameters of the AC power supply circuit 100 and/or the one or more electrical loads (120-140). Monitoring device 110 includes a sensing circuit 112, and a reporting circuit 114 having an input/output communications interface 116 (FIG. 1B). Monitoring device 110 may be configured to be hard wired in AC power supply circuit 100. Monitoring device 110 may, for example, be configured to be wired in a circuit breaker, fuse, or transformer in AC power supply circuit 100.

Sensing circuit 112 may be configured to dynamically determine the available or excess load capacity of the AC power supply circuit 100. For this purpose, sensing circuit 112 may include any suitable measurement device including, for example, one or more voltage and/or current measuring devices. Sensing circuit 112 may be configured to dynamically determine the available load capacity of the AC power supply circuit in response to a user request from external source, or from a present or potential load on AC power supply circuit 100.

Reporting circuit 114 may be configured to report the dynamically available load capacity of AC power supply circuit 100 via input/output communications interface 116 to an external controller, an existing electrical load (e.g., loads 120 or 130), and/or a potential electrical load (e.g., load 140) on the AC power supply circuit. Input/output communications interface 116 may be configured to support electrical wire, wireless, and/or optical communications.

Further, sensing circuit 112 may be configured to dynamically determine the available load capacity of the AC power supply circuit 100 at a sequence of time points, which is based, for example, upon measured electrical characteristics of the circuit and/or on a schedule. The schedule may be related to the electrical frequency of the circuit and call for measurements, for example, multiple times per cycle, once per cycle, or sub-cycle.

Dynamically determining the available load capacity of the AC power supply circuit by sensing circuit 112 may include determining one or more electrical characteristics of the AC power supply circuit. Sensing circuit 112 may be configured, for example, to dynamically sample or measure one or more of a voltage, current, frequency, and/or phase (e.g., between current and voltage) characteristic of AC power supply circuit 100. Sensing circuit 112 may include processing circuits configured to determine the AC power supply circuit load capacity with reference to fuse and/or circuit breaker characteristics. Additionally or alternatively, sensing circuit 100 may include a processing circuit configured to determine the AC power supply circuit load capacity with reference to a database, historical data, and/or external input data.

Monitoring device 110 may also include a prediction circuit 118 configured to predict effects of a potential electrical load (e.g., load 140) on the AC power supply circuit. Prediction circuit 118 may be further configured to determine if the effects of the potential electrical load are within a safe margin of operation of the AC power supply circuit. Prediction circuit 118 may be additionally or alternately configured to determine the effects of the potential electrical load of the AC power supply circuit on an existing load of the AC power supply circuit. For example, prediction circuit 118 may be further configured to determine if the effects on the existing load are within a safe operation of margin with respect to one or more of voltage, current, phase and/or frequency of operation. Prediction circuit 118 further configured to determine the tolerable characteristics of the potential electrical load that can be supplied with power by the AC power supply circuit within its safe operating margin, for example, with reference to acceptable current, reactance, thermal, and/or frequency characteristics. Reporting circuit is further configured to report the tolerable characteristics of the potential electrical load that can be supplied with power by the AC power supply circuit within the latter's safe operating margin to an external controller and/or the potential electrical load.

Prediction circuit 118 may be further configured to predict effects of a proposed action by an existing or potential electrical load on the AC power supply circuit. The proposed actions by an existing or potential electrical load considered by prediction circuit 118 may include, for example, projected power demand versus time information and/or a change in operating conditions by the existing or potential electrical load. Exemplary changes considered by prediction circuit 118 may include, for example, changes in one or more of reactance, sourcing or sinking current requirements, and connection/disconnection state.

Prediction circuit 118 may be further configured to determine whether the predicted effects of the proposed action by the existing or potential electrical load on the AC power supply circuit are within the latter's safe operating margin. Correspondingly, reporting circuit is further configured to report the predicted effects of the proposed action by the electrical load on the AC power supply circuit to an external controller, the existing or potential electrical load and/or other electrical loads or devices.

Either the AC power supply circuit or the existing or potential electrical loads may include suitable control circuits (e.g., circuit 115) to respond to available load capacity information. The control circuits may be configured to control power draw by individual existing or potential electrical loads. Such control circuits may, for example, deny or postpone connection to a potential electrical load if its operation would exceed the available load capacity of AC power supply circuit 110. Alternatively, such control circuits may selectively drop one or more existing loads to supply power to a potential load having a higher priority. Further, such control circuits may schedule actions by the loads (e.g. operations such as power up or shutdown which increase power draw) to maintain a steady power supply to as many electrical loads as possible without tripping hard circuit breakers.

In a version of monitoring device 110, control circuit 115 may be configured to preemptively shut down power supply over AC power supply circuit 110 (e.g., by tripping a circuit breaker) in a planned manner to avoid damage to existing loads or the AC power supply circuit 110 itself if the predicted effects of an action by load indicate that safe operating margins will be exceeded.

Figure 2:
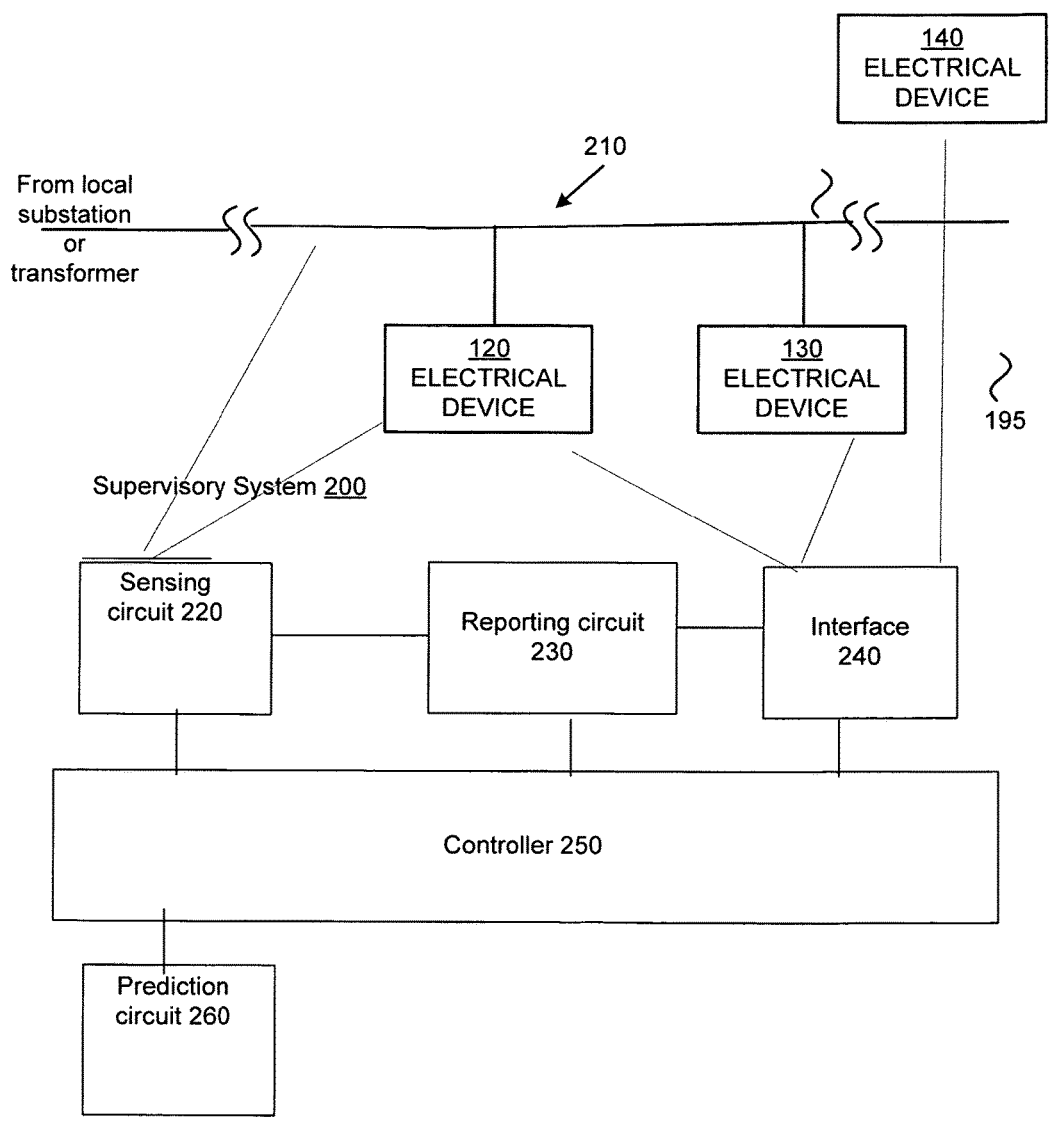
FIG. 2 is a block diagram illustrating of a supervisory system for an AC power supply circuit and its use, in accordance with the principles of the solutions described herein.

More generally FIG. 2 shows a supervisory system 200 for managing operations of an AC power supply circuit 210 downstream of a high-voltage power transmission line, particularly in cases where AC power supply circuit 210 has a limited capacity for supplying power to one or more electrical loads. Supervisory system 200 includes a sensing circuit 220 (e.g., sensing circuit 112) configured to dynamically determine the available load capacity of the AC power supply circuit 210, a reporting circuit 230 (e.g., reporting circuit 114) configured to report the dynamically available load capacity of the AC power supply circuit, a supervisory controller 250, and an communication interface 240. Communication interface 240 may support electrical wire, wireless and/or optical communications between various components of system 200 and one or more electrical loads, potential electrical loads, and/or other devices on the AC power supply circuit.

Sensing circuit 220 in system 200 may be configured to be wired in the AC power supply circuit, for example, in a circuit breaker, fuse, or transformer in the circuit. Dynamically determining the available load capacity of the AC power supply circuit 210 by sensing circuit 220 in system 200 may involve determining one or more electrical characteristics of the AC power supply circuit. Sensing circuit 220 may, for example, dynamically sample or measure one or more of a voltage, current, frequency, and/or phase (e.g., between current and voltage) characteristic of the AC power supply circuit.

Further, sensing circuit 220 may include processing circuits configured to determine the AC power supply circuit load capacity with reference to fuse and/or circuit breaker characteristics and/or with reference to a database, historical data, and/or external input data.

Reporting circuit 230 may be further configured to report the dynamically available load capacity of the AC power supply circuit and/or the effects of a proposed action by an existing or potential electrical load on the AC power supply circuit substantially simultaneously or sequentially to a select group of electrical loads or devices. Reporting circuit 230 may, for example, be configured to send information to a first load or device in a first time period, wait for a second time period, and then send information to a second load or device in a third time period. Further, sensing circuit 220 may be configured to reassess, during the second time period, changes in the available load capacity of the AC power supply circuit due to actions by or changes in the first load or device, and then send information to the second load or device in the third time period.

Alternatively or additionally, reporting circuit 230 may be configured to send information selectively only to those load(s) or device(s) that request information. Further, reporting circuit 230 may be configured while communicating with a set of load(s) or device(s), to transmit "hold" messages or a busy signal to other loads or devices.

In a version of supervisory system 200, sensing circuit 220 may be configured to dynamically determine the available load capacity of the AC power supply circuit at a sequence of time points. The sequence of time points may be based on dynamically measured electrical characteristics of the circuit and/or a schedule. The schedule may be related to the electrical frequency of the circuit and may call for measurements, for example, a multiple times per cycle, once per cycle, or sub-cycle. Further, sensing circuit 220 may be configured to dynamically determine the available load capacity of the AC power supply circuit in response to a request from external source or a present or potential load on the AC power supply circuit.

A version of supervisory system 200 may further include a prediction circuit 260 configured to predict effects of a potential electrical load on the AC power supply circuit. Prediction circuit 260 may be further configured to determine if the predicted effects of the potential electrical load are within a safe margin of operation of the AC power supply circuit. Prediction circuit 260 may, for example, be further configured to determine the tolerable characteristics of the potential electrical load that can be supplied with power by the AC power supply circuit within its safe operating margin. The safe operation margin may include one or more of an acceptable current, reactance, thermal, and/or frequency characteristic. Additionally, reporting circuit 230 may be further configured to report the tolerable characteristics of the potential electrical load that can be supplied with power by the AC power supply circuit within the latter's safe operating margin to the controller and/or the potential load.

Additionally or alternatively, prediction circuit 260 may be further configured to predict effects of a proposed action by an existing or potential electrical load on the AC power supply circuit. The proposed actions considered by prediction circuit 260 may, for example, include projected power demand vs. time information and/or a change in operating conditions by the existing or potential electrical load. Exemplary changes in operating conditions by the existing or potential electrical load that may be considered by prediction circuit 260 include changes in one or more of reactance, sourcing or sinking current requirements, and connection/disconnection state of the electrical load.

Alternatively or additionally, prediction circuit 260 may be further configured to determine whether the predicted effects of the proposed action by the existing or potential electrical load on the AC power supply circuit are within the latter's safe operating margin. Reporting circuit 230 may be further configured to report the predicted effects of the proposed action by the existing or potential electrical load on the AC power supply circuit to the controller, the existing or potential electrical load, and/or other electrical loads or devices.

Supervisory controller 250 may be configured to manage components of the AC power supply circuit and/or the existing or potential electrical loads in response to available load capacity information. Supervisory controller 250 may be configured to control power draw by individual existing or potential electrical loads. Supervisory controller 250 may, for example, deny or postpone connection to a potential electrical load if its operation would exceed the available load capacity of AC power supply circuit 210. Alternatively, supervisory controller 250 may selectively drop one or more existing loads to supply power to a potential load having a higher priority. Further, supervisory controller 250 may schedule actions by the loads (e.g. operations such as power up or shutdown which increase power draw) to maintain a steady power supply to as many electrical loads as possible without tripping hard circuit breakers. Further, supervisory controller 250 may be configured to preemptively shut down power supply over AC power supply circuit 210 (e.g., by tripping a circuit breaker) in a planned manner to avoid damage to existing loads or the AC power supply circuit 210 itself if the predicted effects of an action by load indicate that safe operating margins will be exceeded.

FIG. 3 shows an exemplary method 300 for managing an AC power supply and its use at the customer level downstream of substations in a distribution grid. Method 300 includes dynamically determining the available load capacity an AC power supply circuit that has a limited total capacity for supplying power to one or more electrical loads (310), and reporting the dynamically available load capacity of the AC power supply circuit to one or more electrical loads, potential electrical loads, and/or other devices connected to the AC power supply circuit (320).

In method 300, dynamically determining the available load capacity of the AC power supply circuit may include deploying a sensing circuit (e.g., circuits 112 and 220) wired in the AC power supply circuit, for example, in a circuit breaker, fuse, or transformer. Further, reporting the dynamically available load capacity of the AC power supply circuit may include reporting over electrical wire, wireless and/or optical communication links.

Additionally or alternatively, reporting the dynamically available load capacity of the AC power supply circuit may include reporting the effects of a proposed action by an existing or potential electrical load on the AC power supply circuit substantially simultaneously or sequentially to a select group of electrical loads or devices. The reporting may involve sending information to a first load or device in a first time period, waiting for a second time period, and then sending information to a second load or device in a third time period. During the a second time period, method 300 may involve assessing changes in the available load capacity of the AC power supply circuit due to actions by or changes in the first load or device, and then sending information to the second load or device in the third time period. The reporting may include sending information selectively only to those loads or devices that request information. Further, the reporting may include transmitting a "hold" message or a busy signal to other loads or devices while communicating with a set of loads or devices.

In method 300, dynamically determining the available load capacity of the AC power supply circuit may include deploying a sensing circuit (e.g., circuit 112 or 220) wired in the AC power supply circuit, for example, in a circuit breaker, fuse, or transformer. Further, reporting the dynamically available load capacity of the AC power supply circuit may include reporting over electrical wire, wireless and/or optical communication links. In method 300, the available load capacity of the AC power supply circuit may be determined in response to a request from external source or a present or potential load on the AC power supply circuit.

Further, in method 300, the available load capacity of the AC power supply circuit may be dynamically determined at a sequence of time points. The sequence of time points may be based on dynamically measured electrical characteristics of the circuit and/or on a schedule. The schedule may be related to the electrical frequency of the circuit and call for measurements, for example, multiple times per cycle, once per cycle or sub-cycle.

In method 300, dynamically determining the available load capacity of the AC power supply circuit may include determining one or more electrical characteristics of the AC power supply circuit. Such determination may, for example, include sampling or measuring one or more of a voltage, current, frequency, and/or phase (e.g., between current and voltage) value of the AC power supply circuit. The available AC power supply circuit load capacity may be determined with reference to fuse and/or circuit breaker characteristics, a database, historical data, and/or external input data.

In method 300, dynamically determining the available load capacity of the AC power supply circuit may optionally include predicting effects of a potential electrical load on the AC power supply circuit, and if such effects are within a safe margin of operation of the AC power supply circuit. The method may additionally or alternatively involve determining the tolerable characteristics of the potential electrical load that can be supplied with power by the AC power supply circuit within its (the electrical load's) safe operating margin. The tolerable characteristics of the potential electrical load that can be supplied with power by the AC power supply circuit within its safe operating margin may include one or more of an acceptable current, reactance, thermal, and/or frequency characteristic.

Method 300 may further involve reporting the tolerable characteristics of the potential electrical load that can be supplied with power by the AC power supply circuit within the latter's safe operating margin to a controller and/or the potential load.

Further, in method 300 dynamically determining the available load capacity of the AC power supply circuit may include predicting effects of a proposed action by an existing or potential electrical load on the AC power supply circuit. The proposed actions considered may include, for example, projected power demand vs. time information, and/or a change in operating conditions by the existing or potential electrical load. Exemplary types of changes that may be considered include changes in one or more of reactance, sourcing or sinking current requirements, and/or connection/disconnection state of the electrical load.

Method 300 may include determining whether the predicted effects of the proposed action by the existing or potential electrical load on the AC power supply circuit are within the latter's safe operating margin. Method 300 may further include reporting the predicted effects of the proposed action by the existing or potential electrical load on the AC power supply circuit to a controller, the existing or potential electrical load, and/or other electrical loads or devices.

Method 300 further includes controlling operations of one or more components of the AC power supply circuit and/or the existing or potential electrical loads in response to available load capacity information (330). Such controlling operations 330 may include controlling power draw by individual existing or potential electrical loads. Controlling operations 330 may include denying or postponing connection to a potential electrical load if its operation would exceed the available load capacity of AC power supply circuit. Alternatively, controlling operations 330 may include selectively dropping one or more existing loads to supply power to a potential load having a higher priority. Further, controlling operations 330 may include scheduling actions by the loads (e.g. operations such as power up or shutdown which increase power draw) to maintain a steady power supply to as many electrical loads as possible without tripping hard circuit breakers. Further, controlling operations 330 may include preemptively shutting down power supply over the AC power supply circuit (e.g., by tripping a circuit breaker) in a planned manner to avoid damage to existing loads or the AC power supply circuit itself if the predicted effects of an action by load indicate that safe operating margins will be exceeded.

In the following detailed description, reference is made to the accompanying drawings, which form a part hereof. In the drawings, similar symbols typically identify similar components, unless context dictates otherwise. The illustrative embodiments described in the summary, detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processing circuits (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processing circuits (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems for generation, transmission and distribution of electrical power, a communications system (e.g., a networked system, a telephone system, a Voice over IP system, wired/wireless services, etc.).

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The various aspects and embodiments disclosed herein are for purposes of illustration and are not intended to be limiting, with the true scope and spirit being indicated by the following claims.

The invention claimed is:

1. A supervisory system comprising:
a sensing circuit configured to dynamically determine the available load capacity of an AC power supply circuit downstream of a substation of a high-voltage power transmission and distribution grid, the AC power supply circuit having a limited capacity for supplying power to one or more electrical loads;
a reporting circuit configured to report the dynamically available load capacity of the AC power supply circuit;
a controller configured to respond to the reported dynamically available load capacity of the AC power supply circuit; and
an input/output communication interface communicatively linking the controller with one or more electrical loads, potential electrical loads, and/or other devices on the AC power supply circuit;
wherein the reporting circuit is configured to send information to a first load or device in a first time period, wait for a second time period, and then send information to a second load or device in a third time period.

2. The supervisory system of claim 1, wherein the sensing circuit is configured to be wired in the AC power supply circuit.

3. The supervisory system of claim 1, wherein the sensing circuit is configured to be wired in a circuit breaker, fuse, or transformer.

4. The supervisory system of claim 1, wherein the input/output communication interface supports electrical wire, wireless and/or optical communications.

5. The supervisory system of claim 1, wherein the reporting circuit is further configured to report the dynamically available load capacity of the AC power supply circuit and/or the effects of a proposed action by an existing or potential electrical load on the AC power supply circuit substantially simultaneously or sequentially to a select group of electrical loads or devices.

6. The supervisory system of claim 1, wherein the sensing circuit configured to reassess, during the second time period, changes in the available load capacity of the AC power supply circuit due to actions by or changes in the first load or device, and then send information to the second load or device in the third time period.

7. The supervisory system of claim 1, wherein the reporting circuit is configured to send information selectively only to those load(s) or device(s) that request information.

8. The supervisory system of claim 1, wherein the reporting circuit is configured, while communicating with a set of load(s) or device(s), to transmit "hold" messages or a busy signal to other loads or devices.

9. The supervisory system of claim 1, wherein the sensing circuit is configured to dynamically determine the available load capacity of the AC power supply circuit at a sequence of time points.

10. The supervisory system of claim 9, wherein the sequence of time points is based on a schedule and/or dynamically measured electrical characteristics of the circuit.

11. The supervisory system of claim 1, wherein the sensing circuit is configured to dynamically determine the available load capacity of the AC power supply circuit in response to a request from external source or a present or potential load on the AC power supply circuit.

12. The supervisory system of claim 1, wherein the sensing circuit is configured to determine one or more electrical characteristics of the AC power supply circuit.

13. The supervisory system of claim 12, wherein the sensing circuit is configured to dynamically sample or measure one or more of a voltage, current, frequency, and/or phase characteristic of the AC power supply circuit.

14. The supervisory system of claim 1, wherein the sensing circuit includes processing circuits configured to determine the AC power supply circuit load capacity with reference to fuse and/or circuit breaker characteristics.

15. The supervisory system of claim 1, wherein the sensing circuit includes a processing circuit configured to determine the AC power supply circuit load capacity with reference to a database, historical data, and/or external input data.

16. The supervisory system of claim 1, further comprising a prediction circuit configured to predict effects of a potential electrical load on the AC power supply circuit.

17. The supervisory system of claim 16, wherein the controller is configured to respond to the reported dynamically available load capacity of the AC power supply circuit and the predicted effects of a potential electrical load on the AC power supply circuit.

18. The supervisory system of claim 16, wherein the prediction circuit is further configured to determine the tolerable characteristics of the potential electrical load that can be supplied with power by the AC power supply circuit within its safe operating margin.

19. The supervisory system of claim 16, where the prediction circuit is further configured to determine the tolerable characteristics of the potential electrical load that can be supplied with power by the AC power supply circuit within its safe operating margin.

20. The supervisory system of claim 19, wherein the tolerable characteristics of the potential electrical load that can be supplied with power by the AC power supply circuit within its safe operating margin include one or more of an acceptable current, reactance, thermal, and/or frequency characteristic.

21. The supervisory system of claim 20, wherein the reporting circuit is further configured to report the tolerable characteristics of the potential electrical load that can be supplied with power by the AC power supply circuit within the latter's safe operating margin to the controller and/or the potential load.

22. The supervisory system of claim 1, wherein the controller is configured to dynamically respond to the reported dynamically available load capacity of the AC power supply circuit.

23. The supervisory system of claim 1, wherein the controller is configured to control power draw by individual existing or potential electrical loads.

24. The supervisory system of claim 1, wherein the controller is configured to deny or postpone connection to a potential electrical load if its operation would exceed the available load capacity of AC power supply circuit.

25. The supervisory system of claim 1, wherein the controller is configured to selectively drop one or more existing loads to supply power to a potential load having a higher priority.

26. The supervisory system of claim 1, wherein the controller is configured to schedule actions by the loads to maintain a steady power supply to as many electrical loads as possible without tripping hard circuit breakers.

27. The supervisory system of claim 1, wherein the controller is configured to preemptively shut down the AC power supply circuit in a planned manner to avoid damage to existing loads or the AC power supply circuit itself if the predicted effects of an action by a load indicate that safe operating margins will be exceeded.

28. A method, comprising:
dynamically determining an available load capacity of an AC power supply circuit downstream of a substation in a high-voltage power transmission and distribution grid, the AC power supply having a limited total capacity for supplying power to one or more electrical loads;
reporting the dynamically available load capacity of the AC power supply circuit to one or more present electrical loads, potential electrical loads, and/or other devices connected to the AC power supply circuit; and
controlling operations of one or more components of the AC power supply circuit and/or the existing or potential electrical loads in response to the dynamically available load capacity information;
wherein the reporting includes sending information to a first load or device in a first time period, waiting for a second time period, and then sending information to a second load or device in a third time period.

29. The method of claim 28, wherein determining the dynamically available load capacity of the AC power supply circuit includes deploying a sensing circuit wired in the AC power supply circuit.

30. The method of claim 28, wherein reporting the dynamically available load capacity of the AC power supply circuit includes reporting via electrical wire, wireless and/or optical communication links.

31. The method of claim 28, wherein the reporting includes sending information selectively only to those load(s) or device(s) that request information.

32. The method of claim 28, wherein the reporting includes while communicating with a set of load(s) or device(s) transmitting a "hold" message or a busy signal to other loads or devices.

33. The method of claim 28, wherein dynamically determining the available load capacity of the AC power supply circuit includes determining the available load capacity of the AC power supply circuit in response to a request from external source or a present or potential load on the AC power supply circuit.

34. The method of claim 28, wherein dynamically determining the available load capacity of the AC power supply circuit includes determining one or more electrical characteristics of the AC power supply circuit.

35. The method of claim 28, wherein dynamically determining the available load capacity of the AC power supply circuit includes predicting effects of a proposed action by an existing or potential electrical load on the AC power supply circuit.

36. The method of claim 28, wherein the dynamically determining the available load capacity of the AC power supply circuit includes predicting effects of a potential electrical load on the AC power supply circuit.

37. The method of claim 36, wherein the predicting includes predicting effects of a potential electrical load on the AC power supply circuit includes determining if the effects of the potential electrical load are within a safe margin of operation of the AC power supply circuit.

* * * * *